Figure 1:
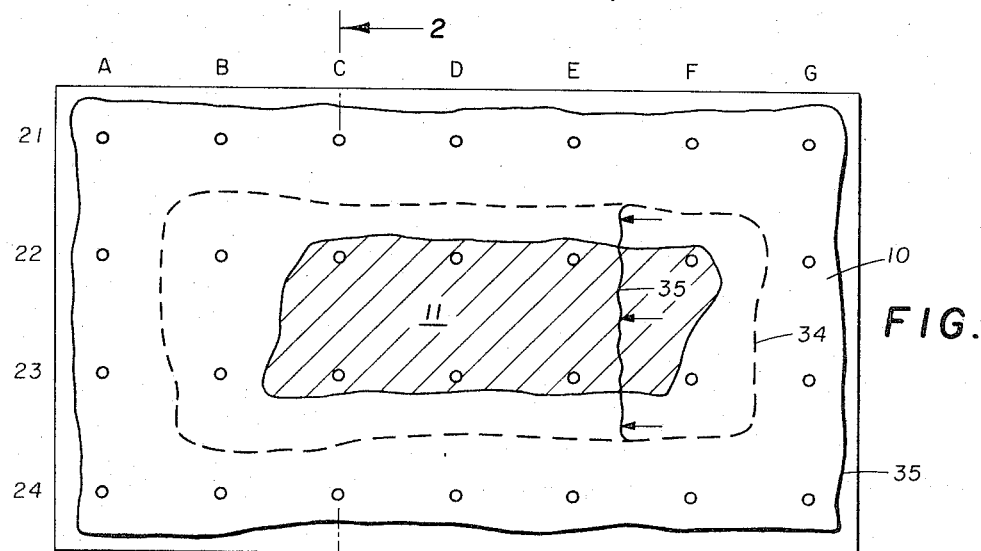

March 14, 1967    J. L. FITCH ET AL    3,309,141

METHOD OF LEACHING SUBSURFACE MINERALS IN SITU

Filed June 4, 1963

JOHN L. FITCH
BILLY GEORGE HURD
INVENTORS

BY *Emil J. Bednar*

ATTORNEY 3,309,141
METHOD OF LEACHING SUBSURFACE MINERALS IN SITU
John L. Fitch and Billy George Hurd, Dallas, Tex., assignors to Mobil Oil Corporation, a corporation of New York
Filed June 4, 1963, Ser. No. 285,291
3 Claims. (Cl. 299—5)

This invention relates to a method for recovering subsurface minerals. More particularly, it relates to a method for in situ leaching of inorganic minerals disposed in subterranean formations.

There are mineral deposits which cannot be extracted from the earth by conventional mining methods to recover their more valuable constituents within economic feasibility. In many instances, these deposits are either disposed deep within the earth or they are of such relatively small extent that providing the necessary tunnels and shafts to reach them through conventional mining procedures is not economically justified.

Many of these mineral deposits were formed by the depositions of valuable metals and other inorganic materials from mineralizing solutions passing through porous, permeable formations. It has been stated that the largest and most valuable mineral deposits occur as disseminated replacements and pore fillings in sedimentary formations. Thus, many of such mineral deposits are found in porous and permeable formations.

Various processes for in situ leaching of such mineral deposits from the porous and permeable formations have been proposed. However, none of these methods has been placed into commercial operation. It is believed that one of the reasons for this lack of use resides in the great loss of the leaching solvents to the formations surrounding the mineral deposits. For example, the solvent leaching of a pod of ore, such as containing uranium, in a porous and permeable sandstone formation can be seen to illustrate the problem. Large amounts of the leaching solvent will readily flow into the surrounding formation without some means for containing the leaching solvent in the pod of ore.

Various means have been proposed for sealing off the desired mineral bodies from the surrounding formations to avoid the above problem. For example, it has been proposed to confine the leaching solvent to the pod of ore by using an enclosing cement grout as a fluid barrier. The serious difficulties in placing such cement grouts, or other fluid barriers, and their excessive costs prohibit use of this means to seal off the pod of ore from the surrounding formation.

This invention is directed toward a method for the in situ leaching of subsurface minerals, such as disposed in pods of ore, through the use of a novel means for sealing off the surrounding formation to prevent the undesired loss of the leaching solvent. By the term "pods of ore," it is means a natural substance, as a metal or nonmetallic inorganic mineral disposed as a replacement or pore filling in a porous and permeable formation.

It is an object of the present invention to provide a method for recovering subsurface minerals. Another object is to provide a method for in situ leaching of inorganic minerals disposed in subterranean formations. Another object is to provide a method for in situ leaching of pods of ore in subterranean formations. Another object is to provide a means for confining a leaching solvent within certain portions of a subterranean formation. Another object is to provide a means for confining a leaching solvent within a pod of ore disposed in a subterranean formation. Another object is to provide a barrier for preventing any undesired flow of a leaching solvent outwardly from a pod of ore into the surrounding formation. Another object is to provide a flow-restricting barrier in a subterranean formation by the use of fluids.

Figure 2:
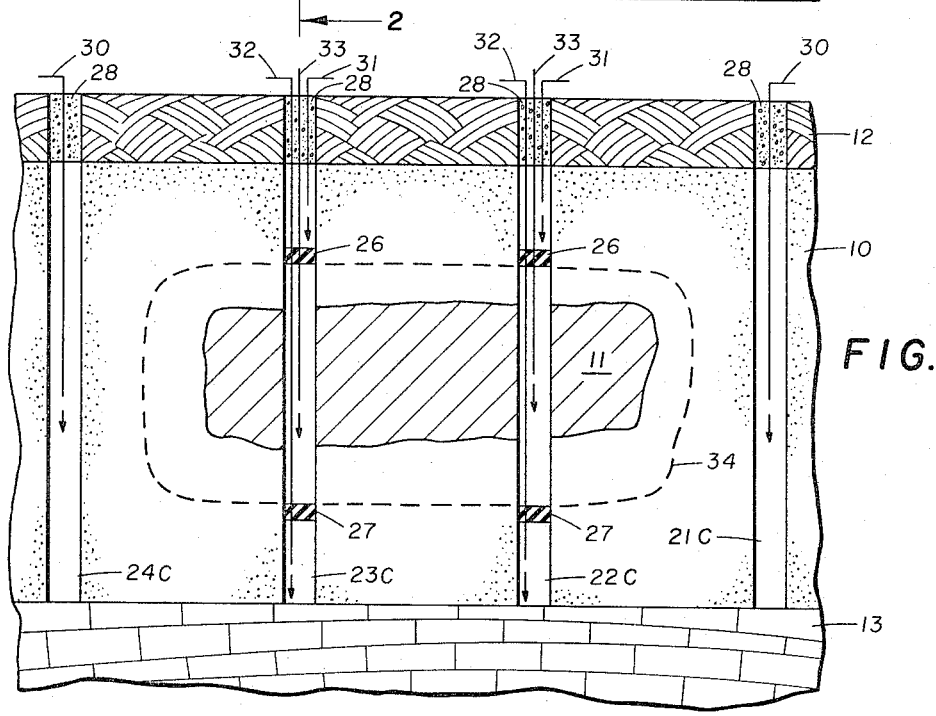

These and other objects will be more apparent when read in conjunction with the following illustrative description, the appended claims, and the attached drawings of a preferred embodiment wherein:

FIGURE 1 is a plan view of a formation surrounding a pod of ore after certain steps of the present method have been practiced, and FIGURE 2 is a vertical section taken along line 2—2 of FIGURE 1.

The objects of the present invention are obtained by practicing certain steps for sealing the formation surrounding a pod of ore, or a selected portion of a mineral body. These steps include injecting an inert fluid into the formation surrounding the pod of ore contemporaneously with injecting a leaching solvent into the pod of ore. The leaching solvent, when pregnant, is removed from the pod of ore by replacing it with an equivalent amount of inert fluid. The rates of injecting the inert fluid into the formation, the leaching solvent, and the inert fluid following the leaching solvent into the pod of ore are adjusted to establish a pressure gradient between the inert fluid in the surrounding formation and the leaching solvent in the pod of ore which pressure gradient is adequate to prevent the flow of the leaching solvent out of the pod of ore into the surrounding formation.

Referring now to the drawings, a description of a preferred embodiment of the method of this invention will be given. In many cases the location and extent of a mineral deposit, such as a pod of ore, in a porous and permeable formation will be known. However, in the event that the pod of ore must be located, any means may be used for this purpose. For example, a formation thought to contain the pod of ore may be subjected to a geophysical survey. The geophysical survey may be any method for locating an ore body such as radioactive logs, gravitometer and magnetometer explorations. Also, the metes and bounds of the ore body may be determined by this or other suitable method. The geophysical survey, for purposes of this description, will be assumed to have been performed upon a portion of the earth to disclose a porous and permeable sandstone formation 10 enclosing a pod of ore 11 containing uranium located between an overburden 12 and a bedrock 13. As seen in FIGURES 1 and 2, the pod of ore 11 is spatially disposed in surrounded relationship by the formation 10. Obviously, conventional in situ leaching by injecting a suitable leaching solvent into the pod of ore 11 will result in an ineffective recovery of uranium because of the undesired flow of the leaching solvent into the formation 10.

It is desirable to know the permeability, porosity, and direction of major fluid flow in the pod of ore 11 and the formation 10. Where this information is not known, it can be determined by a geological survey, such as a well coring program. A plurality of wells may be drilled through the formation 10 and the pod of ore 11 in a desired regular geometric pattern which is believed to be the most economical for covering the geological structures involved. More particularly, a plurality of wells drilled at a uniform and regular spacing from one another and in vertical alignment in rows A through G and in horizontal alignment in lines 21 through 24 are shown in FIGURE 1 for purposes of description. However, it is to be understood that other well patterns may be used as desired. Future identification of an individual well will be by designation of the line and the row in which it resides.

Oriented cores may be taken from the wells during drilling. The permeability, porosity, and direction of greatest fluid permeability in the formation 10 and pod of ore 11 can be readily determined by those skilled in the art from these cores. Also, the presence of innate formation fluids can be determined. The formation fluids, if any are present, are usually water.

The wells provided for the geological survey may be used in practicing the method of this invention. The wells can be adapted to convey fluids between the surface of the earth and the formation 10 or pod of ore 11, as the case may be, by the usual apparatus such as packers, liners, and tubing strings. Referring to FIGURE 2, it will be seen that the pod of ore 11 is surrounded by the formation 10 along the vertical axis. For this reason, as will be apparent more fully hereafter, the wells 22B–F and 23B–F which pass through the pod of ore 11, or immediately adjacent thereto, are provided with packer means to provide independent fluid communication with the pod of ore 11 from the formation 10. More particularly, the wells 22B–F and 23B–F are each provided with packer means 26 and 27. Additional packer means 28 in each well may be provided in overburden 12 to separate fluidly formation 10 from the earth's surface. The bedrock 13 below the formation 10 may be assumed to be an impervious shale. Also, each of the wells 21A–G, 22A and G, 23A and G, and 24A–G is provided with a conduit 30 through the packer means 28 into formation 10 for injecting fluids therein. The wells 22B–F and 23B–F penetrating the pod of ore 11, or passing immediately adjacent thereto, are each provided with conduits 31, 32, and 33. The conduit 31 is adapted to provide fluid communication with the portion of the formation 10 disposed between packer means 26 and 28. The conduit 32 is adapted to provide fluid communication with the formation 10 between the packer means 27 and the bedrock 13. The conduit 33 is adapted to provide fluid communication between packer means 26 and 27 with the adjacent pod of ore 11. Thus, there is provided means for independent fluid communication with the formation 10 and the pod of ore 11.

It is desirable that the pod of ore 11 and the formation 10 adjacent thereto be saturated initially with an inert fluid. This step is useful in preventing capillary dispersions of the fluids to be utilized in the steps to be hereafter described, especially the leaching solvent. The pod of ore 11 and the surrounding formation 10 are flooded by injecting an inert fluid, preferably water, through one or more of the wells, However, other inert fluids can be used if desired. The flow characteristics of the pod of ore 11 and the surrounding formation 10, along with the flow patterns and the pressure gradients developed by the water, can be readily determined by monitoring the rates and pressures of injecting the flooding fluids in this step if not previously determined or known. This information will supplement and confirm the previous geological data. Preferably, the water will be injected into wells 21–24 in row G at one extremity of the well pattern. Usually, the extremity is aligned with the direction of greatest fluid flow in the formation 10 and the pod of ore 11. For example, assuming the direction of greatest fluid flow is shown by the arrows in FIGURE 1, the water is injected into the wells 21–24 in the row G and passed through the formation 10 and the pod of ore 11 until it appears in the wells 21–24 in the row A. By this means, the formation 10 and the pod of ore 11 are, for practical purposes, saturated with water.

As a step of our invention, a leaching solvent is injected through the conduits 33 in the wells 22B–F and 23B–F into the pod of ore 11. For purposes of illustration, the leaching solvent is an aqueous solution of sulfuric acid which contains sodium chlorate for oxidizing the uranium in the pod of ore 11 into an acid-soluble form. Sufficient sulfuric acid is used to react with all the acid-consuming materials in the pod of ore 11 and yet leave a residual solution of not less than about 0.005 molar $H_2SO_4$. Preferably, twice the stoichiometric amount of sodium chlorate to oxidize the uranium is used in the acid solution. This leaching solvent can be recovered by displacing it with water from the pod of ore 11. Although the present description is specific to the acid leaching of uranium, it will be apparent to those skilled in the art that it may be used to recover various other inorganic minerals with suitable respective solvents for them. Generally, an amount of leaching solvent equal to 1 pore volume with respect to the pod of ore 11 will be sufficient. However, as will be apparent hereafter, the amount of leaching solvent may be substantially less. The desired volume of leaching solvent is injected into the pod of ore 11 at a rate that the leaching solution remains therein for a sufficient length of time to dissolve the desired amount of uranium. The leaching solvent containing such dissolved uranium, for purposes of description, will hereafter be denoted as the pregnant solvent. The contact time of the leaching solvent with the pod of ore 11 can also be regulated to some extent by adjusting the total volume of the leaching solvent injected.

Referring to FIGURE 2, the leaching solvent may be injected via conduits 33 between packer means 26 and 27 in the wells 22B–F and 23B–F forcing the water in the pod of ore 11 outwardly into formation 10 until the flood pattern within the bounds of chain-line 34 is formed. This insures that the leaching solvent is placed into substantially intimate contact with the entire vertical and horizontal extent of the pod of ore 11. Preferably, the leaching solvent is injected into conduits 33 in wells 22F and 23F while water, at an equal rate, is removed from conduits 33 in wells 22B and 23B. By this means, the pod or ore 11 is filled behind a front 35 moving therethrough. Obviously, if the water were not removed at rates equal to the injection of the leaching solvent, the flood pattern illustrated by chain-line 34 must expand. Contemporaneously with injecting the leaching solvent into the pod of ore 11 an inert fluid, preferably water, is injected into the wells in fluid communication with the surrounding formation 10 by means of conduits 30, 31, and 32.

The rates of injecting water through conduits 30 in wells 21A–G, 24A–G, 22A and G, and 23A and G, and through conduits 31 and 32 in wells 22B–F and 23B–F into the surrounding formation 10 is adjusted with respect to the rates at which the leaching solvent is injected into the pod of ore 11 so that there is established a fluid pressure gradient in the formation 10 about the pod of ore 11 adequate in magnitude to prevent the flow of the leaching solvent outwardly from the pod of ore 11 toward the surrounding formation 10. It will be obvious that some of the water in formation 10 will flow outwardly and away from the pod of ore 11 in order to urge a small portion of the water inwardly toward the pod of ore 11. Thus, injection of water via the wells into the formation 10 about the pod of ore 11 must be continued for the time interval that the leaching solvent is in the pod of ore 11. It is by this means that the desired pressure gradient is maintained.

Generally, it will be desirable to control the injection pressure at which the leaching water and solvent are introduced into the formation 10 and the pod of ore 11, respectively, to a value below the formation breakdown pressure. It can be envisioned however that fracturing may be desirable in some cases.

The injection rates necessary to maintain the desired fluid pressure gradients and fluid movements heretofore described can be calculated from the information previously obtained from the geological survey, the characteristics of the leaching solvent and the inert fluid, and the flow properties of these fluids in the pod of ore 11 and the formation 10 by calculations well known to those familiar with the control of the flow of fluids through porous media. Reference may be had to the text Physical Principles of Oil Production, M. Muscat, 1949, for further information as to these calculations.

This method of containing the leaching solvent within the flood pattern indicated by chain-line 34 to leach the pod of ore 11 is applicable to both areal and vertical confinement of the leaching solvent. Referring to FIGURE 2, there may be instances where it is desirable to increase the confinement of the leaching solvent along the vertical axis. For example, the effects of gravity flow may become significant where a long flow path or extended time intervals are involved, or where the leaching solvent or the pregnant solvent has a greatly different density than the water in formation 10. Stated in another manner, the pressure created by vertical gravity flows of the leaching solvent, and its products, becomes significant with respect to the pressure gradients obtainable in the formation 10 surrounding the pod of ore 11. In such cases the density of the water injected above or below the pod of ore 11 may be adjusted to compensate for the gravity flow characteristics of the leaching solvent. For example, ground or surface water is injected via conduits 31 into the formation 10 above the pod of ore 11. A brine solution is injected via conduits 32 into that portion of the surrounding formation 10 below the pod of ore 11. Thus, the flow confining abilities of the water along a vertical axis can be amplified.

The leaching solvent is allowed to remain in contact with the pod of ore 11 for sufficient time to dissolve the desired quantity of uranium to be recovered. Thereafter, as another step, the leaching solvent is removed from the pod of ore 11 via one or more of the wells 22B–F and 23B–F by any suitable means. Preferably, the leaching solvent is contemporaneously replaced with an equivalent amount of water through other of the wells into the pod of ore 11. This will prevent excessive mixing and therefore dilution of the pregnant solvent with the water present in the formation 10 or injected behind the leaching solvent into the pod of ore 11. Various other modes of removing the leaching solvent when pregnant from the pod of ore 11 and replacing same with an equivalent amount of inert fluid may be used.

The containment of the leaching solvent by simultaneous circumferential injection of the inert fluid in the surrounding formation 10 about the pod of ore 11 has been described. It will be obvious, however, that the injection of these respective fluids may be taken in a stepwise or line-drive procedure from one extremity to the other of the structure shown in the FIGURES 1 and 2. For example, water may be initially injected only through the wells 21–24 in row G to move a flood pattern toward the wells 21–24 in row A. As the flood pattern reaches the wells 21–24 in row F, leaching solvent is injected via conduits 33 into the wells 22F and 23F. Simultaneously, water is injected via conduits 30 into the wells 21F and 24F and conduits 31 and 32 into wells 22F and 23F. The injection rates of the respective fluids are regulated so that the advancing edges of the flood patterns of the water and the leaching solvent moving toward the row of wells 21–24 in row A are aligned. As the flood pattern reaches each successive row of wells, the injection of water and leaching solvent is initiated in the manner described. At the row A, water is injected into all of the wells 21–24 upon arrival of the flood pattern. In order to accommodate the leaching solvent in the flooded pod of ore 11, it will be obvious that an equivalent amount of the water previously introduced therein must be removed through the wells in advance of the leaching solvent. It may be found that the leaching solvent needs to be injected only into wells 22F and 23F since it will flow toward the wells 22B and 23B bounded by the water injected into the wells 21A–G and 24A–G. The injection of the leaching solvent is terminated when the leaching solvent produces a flood pattern illustrated by chain-line 34. The injection of the water through the wells in row A may also be terminated when the desired pressure gradient is obtained providing a static fluid barrier. Usually, injection of the water into the wells 21A–G, 24A–G, 22A and G, and 23A and G in the surrounding formation 10 must be continued because of the radially, outwardly movement of some of the water away from the pod of ore 11 into the formation 10 as shown by a flood pattern boundary 35.

In a modification of the embodiment heretofore described, a slug of the leaching solvent is introduced through the wells 22F and 23F in an amount of between the stoichiometric equivalent of the uranium to be leached from the pod of ore 11 and about 1 pore volume of the pod of ore 11. Usually, not over 0.5 pore volume of leaching solvent is required. Generally, 0.2 pore volume of leaching solvent is adequate. After the slug of leaching solvent is introduced into the pod of ore 11, water is injected into wells 22F and 23F as a miscible fluid drive propelling the leaching solvent through the pod of ore 11. The leaching solvent is recovered through wells 22B and 23B. The other steps of the method of this invention will remain the same.

From the foregoing it will be apparent that the method of this invention has provided a plurality of steps for injecting a leaching solvent into a pod of ore 11 and inert fluids into the surrounding formation 10 in a manner to prevent the loss of the leaching solvent into the surrounding formation 10 and also to facilitate the complete recovery of the pregnant solvent. Various techniques known to those skilled in the art of miscible displacements of petroleum may be applied to the present invention. For example, fluid buffer zones may be established between the leaching solvent and the inert fluids where undesired reactions might be produced. Further, techniques employed in the production of petroleum may be utilized to assist in maintaining a uniformity in the flow of fluids in the formation of interest. For example, streaks of high permeability or other permeability inhomogeneities may exist to cause channeling of injected fluids. Therefore, it may be desirable to use chemically produced gels or precipitates at selected locations to reduce the effects of these undesired formation characteristics. Other means for adjusting the fluid flows in the formations may also be used.

Although the illustrative embodiment is directed toward the recovery of subsurface minerals by in situ leaching of a pod of ore with a suitable solution, it will be apparent to those skilled in the art that a selected portion of a massive mineral-containing formation may be in situ leached by the same method. The term "pod of ore" is used herein to also include this usage.

Various modifications may be made to the priorly described method without departing from the spirit of this invention by those skilled in the art. It is intended that the foregoing description be taken as illustrative and not limitative so as to encompass such modifications. Further, it is intended that the only limitations to be applied to the present invention are those set forth in the appended claims.

What is claimed is:

1. A method for recovering subsurface minerals comprising:
   (a) locating a pod of ore in a subterranean formation,
   (b) performing a geological survey to determine the direction of greatest fluid flow in the pod of ore,
   (c) drilling a plurality of wells into the formation wherein at least one well penetrates the pod of ore,
   (d) flooding the pod of ore and the adjacent surrounding formation by injecting an inert fluid through one or more of the wells,
   (e) injecting an inert fluid via some of the wells into the formation adjacent to and surrounding the pod of ore contemporaneously with injecting a slug of leaching solvent via a well into the pod of ore at an extremity of the pod of ore aligned with the direction of greatest fluid flow from the remainder of the pod of ore,
   (f) miscibly displacing the leaching solvent through the pod of ore by injecting an inert fluid through a well into said extremity of the pod of ore,
   (g) removing the leaching solvent when pregnant from the pod of ore and replacing same with an equivalent amount of an inert fluid, and (h) adjusting the injection of the inert fluid into the formation, the leaching solvent into the pod of ore, and the inert fluid following the leaching solvent into the pod of ore at rates sufficient to establish a pressure gradient in the formation about the pod of ore adequate to prevent the flow of the leaching solvent out of the pod of ore into the surrounding formation.

2. The method of claim 1 for recovering uranium wherein the leaching solvent comprises an aqueous solution of sulfuric acid and sodium chlorate, and the inert fluid is water.

3. The method of claim 1 for recovering uranium wherein the slug of the leaching solvent is an amount between the stoichiometric amount of the substance desired to be leached from the pod of ore and one pore volume of the pod of ore.

References Cited by the Examiner

UNITED STATES PATENTS

| | | | |
|---|---|---|---|
| 2,718,263 | 9/1955 | Heilman et al. | 166—11 |
| 2,738,253 | 3/1956 | Thunaes et al. | 23—14.5 |
| 2,818,240 | 12/1957 | Livingston | 299—4 |
| 3,152,640 | 10/1964 | Marx | 61—0.5 X |

FOREIGN PATENTS 296,813  9/1928  Great Britain.

OTHER REFERENCES

"Bubble" Storage Test Delayed, The Oil and Gas Journal, June 5, 1961, page 48.

ERNEST R. PURSER, *Primary Examiner.*

JACOB L. NACKENOFF, *Examiner.*